US008424088B1

(12) United States Patent
Kowalyshyn

(10) Patent No.: US 8,424,088 B1
(45) Date of Patent: Apr. 16, 2013

(54) BARRICADING A COMPUTER SYSTEM WHEN INSTALLING OR MIGRATING SOFTWARE

(75) Inventor: Daniel Kowalyshyn, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1547 days.

(21) Appl. No.: 11/375,923

(22) Filed: Mar. 14, 2006

(51) Int. Cl.
*H04L 29/06* (2006.01)

(52) U.S. Cl.
USPC ........ 726/23; 726/1; 726/4; 726/26; 717/168; 717/173; 717/174; 717/178

(58) Field of Classification Search ............ 726/23, 726/4, 20, 3, 22; 713/165, 192, 160, 191, 713/174–178; 340/903, 905; 717/168–178; 714/38
See application file for complete search history.

(56) References Cited

U.S. PATENT DOCUMENTS

| 5,978,911 | A * | 11/1999 | Knox et al. ............... 713/1 |
| 6,662,020 | B1 * | 12/2003 | Aaro et al. ............ 455/552.1 |
| 6,725,377 | B1 * | 4/2004 | Kouznetsov ................ 726/23 |
| 7,797,752 | B1 * | 9/2010 | Vaidya et al. .............. 726/27 |
| 2002/0100036 | A1 * | 7/2002 | Moshir et al. ............ 717/173 |
| 2003/0140272 | A1 * | 7/2003 | Lawrance et al. ............ 714/13 |
| 2005/0050337 | A1 * | 3/2005 | Liang et al. ............... 713/188 |
| 2006/0010485 | A1 * | 1/2006 | Gorman ...................... 726/3 |
| 2006/0053419 | A1 * | 3/2006 | Barfield et al. ............ 717/173 |
| 2006/0080656 | A1 * | 4/2006 | Cain et al. ............... 717/174 |
| 2006/0117384 | A1 * | 6/2006 | Larson et al. .............. 726/22 |
| 2006/0174319 | A1 * | 8/2006 | Kraemer et al. ............. 726/1 |
| 2007/0118646 | A1 * | 5/2007 | Gassoway ................. 709/225 |

OTHER PUBLICATIONS

On the Effectiveness of Probabilistic Packet Marking for IP Traceback under Denial of Service Attack; Lee et al; INFOCOM 2001. Twentieth Annual Joint Conference of the IEEE Computer and Communications Societies. Proceedings. IEEE; 2001.*

* cited by examiner

*Primary Examiner* — Taghi Arani
*Assistant Examiner* — Jason Lee
(74) *Attorney, Agent, or Firm* — Fenwick & West LLP

(57) ABSTRACT

During a migration or installation of a software application (e.g., a security software application), a computer can be left vulnerable to attack by malicious code. However, a computer can be protected during an installation process by disabling routes through which a malicious attack might occur. More specifically, a determination module determines that the installation process for the security software application will be performed. When the installation process begins, a communication disabling module disables substantially all communication through external network connection ports for the computer that are unneeded for the installation process. In some embodiments, a process restriction module also restricts execution of processes which are not associated with the installation of the security software application. An installation module allows the installation process for the security software application to be performed on the computer. A communication reopening module then reopens the communication through the external network connection ports upon completion of the installation process.

12 Claims, 5 Drawing Sheets

BARRICADING A COMPUTER SYSTEM WHEN INSTALLING OR MIGRATING SOFTWARE

BACKGROUND OF THE INVENTION

1. Field of the Invention

This invention pertains in general to installing and migrating of software packages on computers, and more specifically to techniques for securing the computer environment during the period of time when an install or migration occurs.

2. Description of the Related Art

Modern computer operating systems commonly communicate over networks. Typically they will send, and receive messages over some network protocol and medium. Computer systems are constantly bombarded with security attacks over the network medium whether it is dialup, cable modem, DSL, satellite, WIFI, BLUETOOTH®, any other wireless network, or wired LAN/WAN network connections. This medium, if not protected, can act as a propagation conduit for computer security risks or malicious code, such as worms, viruses, and Trojan horses.

Modern computer systems are further threatened by the increasing speed at which this malicious code can attack and can propagate itself to other computer systems. In the 1980's security risks took weeks and months to propagate. Today, with modern networks and the Internet, security risks can spread around the world in minutes. Opening up a vulnerable computer system to a network can result in a security infection in milliseconds. For example, the recent Slammer worm moved so quickly that any computer that was not protected by a firewall would be almost guaranteed to be infected within minutes by this worm.

Security software, such as antivirus prevention/detection software, can be installed on computers in an attempt to prevent malicious code attacks. For example, antivirus-scanning software scans computer files, including electronic message attachments and electronic messages, to detect the presence of malicious code. Most security software is acquired from third party vendors. Thus, the security software may not be part of the base operating system or image for a computer system and may need to be installed onto the computer system. In addition, when switching to a new/different version of the security software, a software migration must be performed once the new/different version is acquired from the vendor. When installing new security software or migrating current security software (from one version to another version) there can be a period when no security software is actively protecting the computer system. For example, when doing an installation/migration, there will likely be a period of time during which a firewall program that is protecting the computer may be disabled. This time window can leave a vulnerable computer system open to the risk of attack from viruses, worms, etc. With the speed at which malicious code can propagate itself and infect computer systems today, even a very small time window without protection can put a computer system at great risk of attack.

Therefore, there is a need in the art for a solution that effectively protects or barricades a computer system from attack by malicious code while software (such as security software) is being installed on the computer or while a software migration is being performed.

DISCLOSURE OF INVENTION

The above need is met by a protection control module that protects a computer during an installation process for a security software application on the computer. A determination module determines that the installation process for the security software application will be performed. A communication disabling module disables substantially all communication through external network connection ports for the computer that are unneeded for the installation process. The communication is disabled when the installation process begins. In some embodiments, temporary installation communications are allowed to take place on the on external network connection ports required for the installation process, but these communications are disabled once the external network connection ports are no longer needed for the installation process. In some embodiments, all external network connections are disabled until the installation process is completed. Further, in some embodiments, a process restriction module restricts execution of substantially all processes which are not associated with the installation of the security software application. An installation module allows the installation process for the security software application to be performed on the computer. A communication reopening module reopens the communication through the external network connection ports upon completion of the installation process (e.g., once the installation or migration has occurred or once a security scan has been conducted). The installation process can be either a process for installing a security software application on the computer or a process for migrating from one version of the security software application to second version of the security software application.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
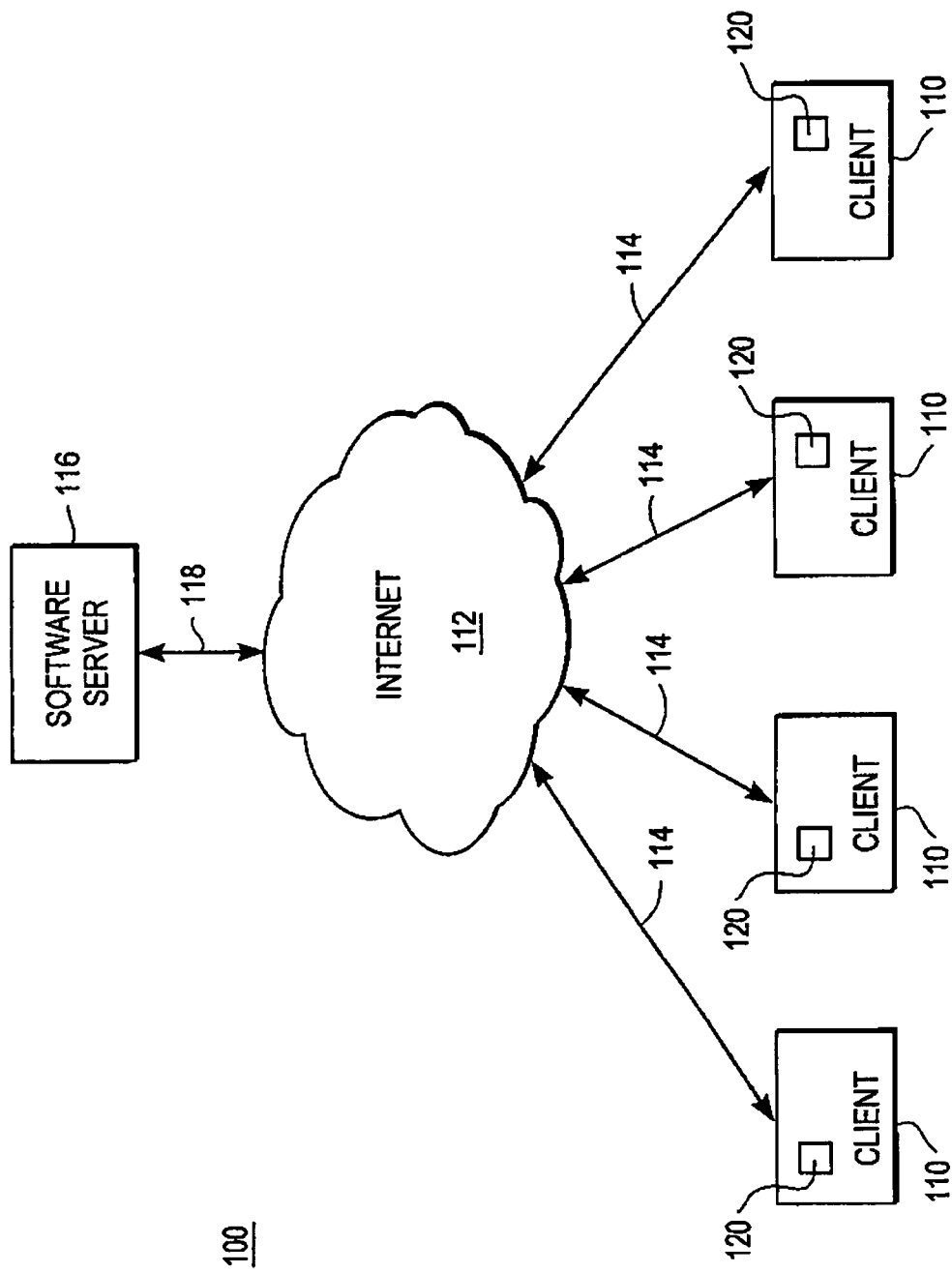
FIG. 1 is a high-level block diagram illustrating an example of a standard computing environment 100, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

As described above, during the course of installing or migrating (e.g., switching from one version to another, uninstalling older versions and re-installing or replacing with newer versions, etc.) a software installation package (e.g., a security software package) on a computer system, the computer system may become vulnerable to any number of security risks. The protection control module mitigates this risk by disabling all communication channels for the duration of the install or migration events. Once the install has been completed, regular network communications can be re-established.

As used herein, "malicious computer code" or "malicious code" is any code that enters a computer without an authorized user's knowledge and/or without an authorized user's consent. Malicious code may or may not include the ability to replicate itself and compromise other computer systems. For example, malicious code may attach itself to files stored by a computer system or use a network to infect other clients through password cracking, buffer overflow attacks, e-mail distribution, etc. The term "security software" is any software or software package for protecting a computer system against attacks by malicious code. For example, security software can include an antivirus software, firewalls, spy-ware, ad-ware, phishing software, and so forth. The term "computer" or "computer system" includes conventional computer systems, laptops, electronic devices, wireless mobile or handheld devices, etc., and further including systems such as personal communications devices, cellular telephones, personal digital assistants (PDAs), pocket PC's, tablet computers or notebooks (e.g., GATEWAY® CONVERTIBLE NOTEBOOK, WINDOWS® XP TABLET PC EDITION, etc.), music or MP3 player systems (e.g., IPOD®), video players, camera systems, multipurpose devices or smartphones that include one or more of the features described above such as a device with phone, PDA, camera, and other capabilities (e.g., PALM® TREO® 700w, MOTOROLA® Q, etc.), and so forth. The client computers 110 described below with regard to FIG. 1 and the computer system 200 described with regard to FIG. 2 are some examples of a computer system. The term "installation process" refers to any type of installation of a software application onto a computer or migration of a software application on a computer. Migration can include switching from one version of a software application to another version, uninstalling older versions and re-installing or replacing with newer versions, switching from one software application to a different or different type of software application, etc.

Figure 2:
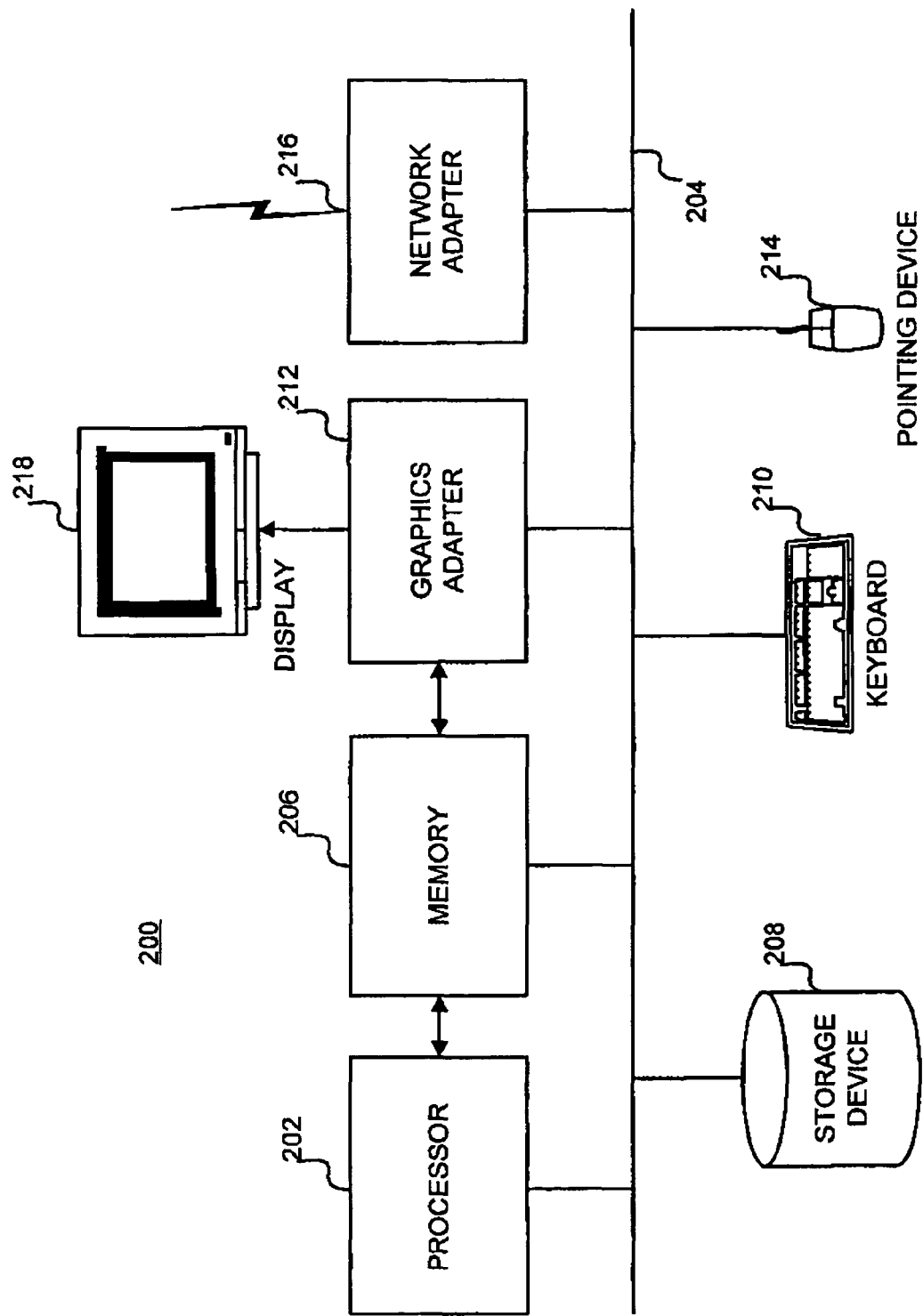
FIG. 2 is a high-level block diagram illustrating a standard computer system 200 for use with the present invention.

FIG. 1 is a high-level block diagram illustrating a computing environment 100 according to an embodiment of the present invention. Multiple client computers 110 are in communication with the Internet 112 or other network, such as a local area network, wide area network, etc. via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having connectivity to remote update sources, such as cellular telephones, PDAs, pocket PC's, etc. A server 116 is also connected to the Internet 112 via a communications link 118.

As is known in the art, the client computers 110 preferably execute an operating system and one or more application programs. The operating system controls the operation of the computer system, and some examples of such an operating system include LINUX®, one of the versions of MICROSOFT WINDOWS®, MAC OS®, and PALM OS®.

In FIG. 1, each client computer 110 is connected to the Internet 112 via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to directly connect to the Internet 112. In still other embodiments, the communications link 114 connects the client computer 110 via a wireless 802.11, dialup, cable modem, DSL, BLUETOOTH®, or mobile phone (e.g., CDMA or GSM) network, satellite downlink, uplink, or bi-directional link, or any other wireless or wired LAN/WAN network connections. Thus, many different types of technology can be used to provide the functionality of the communications link 114.

As known in the art, the Internet is a large, publicly-accessible network of networks. Individual computers and other devices can utilize communications protocols, such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can send software or software updates across the Internet 112 to the client computers 110. For example, the server 116 might be controlled by a third-party vendor selling or providing free security software for download by a user. Additionally, the client computers 110 can send out information or make requests (e.g., a request for a security software application or a different version of an already-installed application, etc.) across the Internet 112 to the server 116 or to other computers 110. In addition, malicious code can travel from one computer 110/server 116 to another over the network links 118, 114. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, each client computer 110 executes a protection control module 120 for protecting a computer system during installation or migration of software on the system. The protection control module 120 can be a discrete application program, or the module 120 can be integrated into another application program or the client computer's 110 operating system. In some embodiments, a portion of the protection control module 120 is executed on the server 116. Though the clients 110 are shown as being connected to the Internet 112, in some embodiments the clients 110 are only connected to the Internet 112 for a certain period of time or not at all. Other modifications can be made to accommodate any of the other numerous embodiments of the protection control module 120.

FIG. 2 is a high-level block diagram illustrating a functional view of a typical computer system 200 for storing and executing the protection control module 120, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules are stored on the storage device 208, loaded into the memory 206, and executed by the processor 202. Alternatively, hardware or software modules may be stored elsewhere within the computer system 200.

Figure 3:
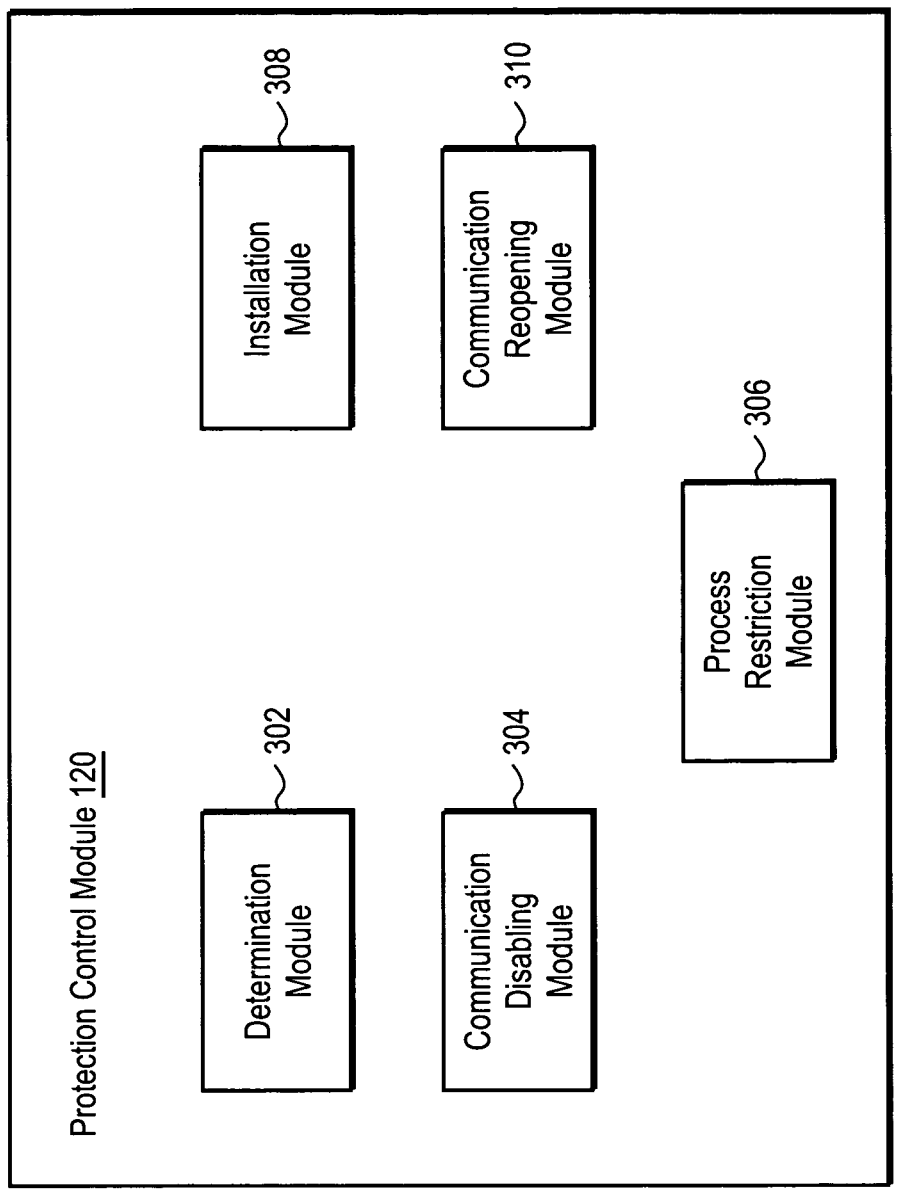
FIG. 3 is a high-level block diagram illustrating the functional modules within the protection control module 120, according to one embodiment of the present invention.

FIG. 3 is a high-level block diagram illustrating the functional modules within the protection control module 120, according to one embodiment of the present invention. The protection control module 120, in the embodiment illustrated in FIG. 3, includes a determination module 302, a communication disabling module 304, a process restriction module 306, an installation module 308, and a communication reopening module 310. Those of skill in the art will recognize that other embodiments can have different and/or additional modules than those shown in FIG. 3 and the other figures. Likewise, the functionalities can be distributed among the modules in a manner different than described herein. When describing the embodiments of the invention below, the examples frequently focus on security software. However, the invention is not limited to security software, but also applies to any other type of software.

The determination module 302 determines that an installation process for a software application will be performed. The software application may originate from a third party software vendor that is selling or offering free software. In some embodiments, the user downloads the software application to be installed or the version for migration from the vendor's website via server 116.

The determination module 302 can determine that the user has requested an application from the vendor or that the application is being downloaded. This determination can be made in numerous manners. In some embodiments, the present invention is included as a part of installation software on the user's computer or installation software associated with the software package being downloaded. In these embodiments, the determination 302 module determines that the installation process will be performed since the module is a part of the installer, itself. In other embodiments, the module 302 is separate from the installer. In these embodiments, the determination module is notified or otherwise becomes aware that the installation will be occurring. For example, the module 302 might receive notification from the installation software or another process on the computer that is aware that the application will be installed on the computer or that a software migration will be occurring.

The communication disabling module 304 disables substantially all communication through external network connection ports for the computer that are unneeded for the installation process. For example, the module 304 can shut down communication for a computer 110 through all wireless, BLUETOOTH®, Ethernet, serial port connections, and any other connection that allows the computer 110 to communicate over a network external to the computer 110. This communication is typically disabled when the installation process begins. Thus, once the determination module 302 becomes aware that the installation/migration will be performed (or once the installation process begins or the firewall is shut down), the module 304 can disable the communication. In this manner, the module 304 can mitigate the risk of a malicious code attack on the computer 110 while the installation process (e.g., installing of the application or migration from version to version) is taking place. For example, when security software is being installed/migrated on a computer 110, the computer 110 may be unprotected during the time of the installation process, leaving open a chance for malicious code to strike while the computer 110 is vulnerable. However, if only communications necessary for the installation process to occur are permitted (and all or substantially all other communications are prohibited), the malicious code cannot easily be transferred over an external network to the computer 110 during this period of vulnerability.

The disabling of communications can be performed in a number of ways. For example, some modern operating systems include an application programming interface (API) for allowing programs to make certain changes, such as changes to network ports or to a built-in software firewall. Through these interfaces, network devices (e.g., a computer, a pocket PC, a PDA, a cellular phone, etc.) can be disabled temporarily by disabling the network stack or disabling the driver for the network. Thus, basic software firewall or network API's can be leveraged to conduct these barricading actions (e.g., the disabling of communications for the computer 110). Through these API's, the module 304 can disable some or all external network communications, thus providing protection for the computer 110 from attacks over the network during the installation process.

Some software applications require external network communications during the installation and migration stages. For example, some security software applications must communicate with an external server (e.g., server 116) in order to complete the installation or migration of the software. Some examples include managed network installations, product updates (e.g., using SYMANTEC LIVE-UPDATE®), virus definition file updates, and so forth. Applications performing these types of functions may require connection to an external network over which the network installation can occur, the product to be updated can be sent, or the new virus definitions can be sent, etc. For example, for some types of client/server antivirus software, the clients 110/servers 116 may need to communicate (e.g., to acquire the latest virus definitions, security keys, etc.) with a parent server to acquire all of the information needed for proper installation. The module 304 allows these types of communications by shutting down or disabling any unneeded connections ports for the installation process. However, communications necessary for installation/migration can be allowed to take place on communication ports required for the installation process. In some embodiments, once these required installation process communications have been completed, these temporary connections are also closed down. Thus, at this point, all (or substantially all) computer systems network connections have been disabled. In other embodiments, module 304 ensures these software applications that require external network communications during the installation/migration first download any information or files that might be needed to complete the installation/migration before the process begins. Thus, these applications will have stored locally everything needed to complete the installation/migration before communication is disabled.

In some embodiments, the communications disabling module 304 disables all computer systems network connections from the beginning of the installation process. Thus, the module 304 prevents even communications that might be needed for installation. In these embodiments, only installers that do not require external communications to complete the installation process (or have downloaded all files needed before communications are disabled) will function.

In some embodiments, the module 304 is designed to shut down all communications unless notified that the installation process requires some communications. Once notified, the module 304 can permit these installation communications. In some embodiments, the user and/or vendor has some ability to configure the module 304 to control which communications are permitted or if any are permitted.

In some embodiments, the process restriction module 306 restricts execution of substantially all processes which are not associated with the installation of the software application. To further mitigate the risk of attack, the module 306 can deploy a temporary application to restrict the running of any non-installer processes during the installation. In some embodiments, only processes associated with or necessary for the installation process to occur are allowed to be executed. For example, the module 304 might permit only SYMANTEC® installer dll's or MICROSOFT® MSI engine processes to be created. If a non-installation process or another process that is not trusted does spawn during the installation or migration, then that process can be suspended or terminated, as appropriate.

This restriction of non-installer processes by module 306 can be performed along with the disabling of communications by the communication disabling module 304 or instead of the disabling of communications described above. In some embodiments, the user and/or vendor can configure or has some control over whether and when the module 306 restricts certain processes. In some embodiments, the process restriction module 306 is not present in the invention. Thus, the non-installer processes are not restricted in any way, but instead the computer 110 is protected only by disabling of communications by module 304, as described above.

The installation module 308 allows the installation process for the security software application to be performed on the computer 110. While the communications are disabled by module 304 (and/or the non-installation processes restricted by module 306), the module 308 allows the installation or migration of the software application. During this time, the computer 110 is protected from attacks by malicious code since the communications (and/or non-installer processes) are disabled. Where the protection control module 120 is a part of the installation software that is performing the installation process, the installation module 308 and/or other portions of the installation software can perform the installation/migration of the software.

The communication reopening module 310 reopens the communication through the external network connection ports upon completion of the installation process. In some embodiments, the module 310 does not reopen communication until the entire installation process is completed and the application has been installed or the migration has been performed. In other embodiments, the module 310 only reopens communications when a security scan of the computer 110 has been performed. The scan might be performed before the installation process is fully completed. The scan might also be performed after the installation process is complete. In still other embodiments, the module 310 reopens communication after some other defined event occurs.

In some embodiments, the module 310 provides a mechanism for reopening communication during the installation/migration, if needed. For example, if the installation or migration fails during the actual process of installing or migrating the software (e.g., the software is only partially installed/migrated, an error is received, the computer crashes, or some other problem occurs that affects the installation process), the module 310 will allow communication to be reestablished for the computer 110 even though the installation process has not yet been completed. In some embodiments, an administrator for the computer 110 is given the capability to allow the computer 110 to reconnect upon failure of the installation process or some other type of error. Thus, if the installation process fails for some reason, the client computer 110 can still reconnect to the network and is not left unconnected.

Figure 4:
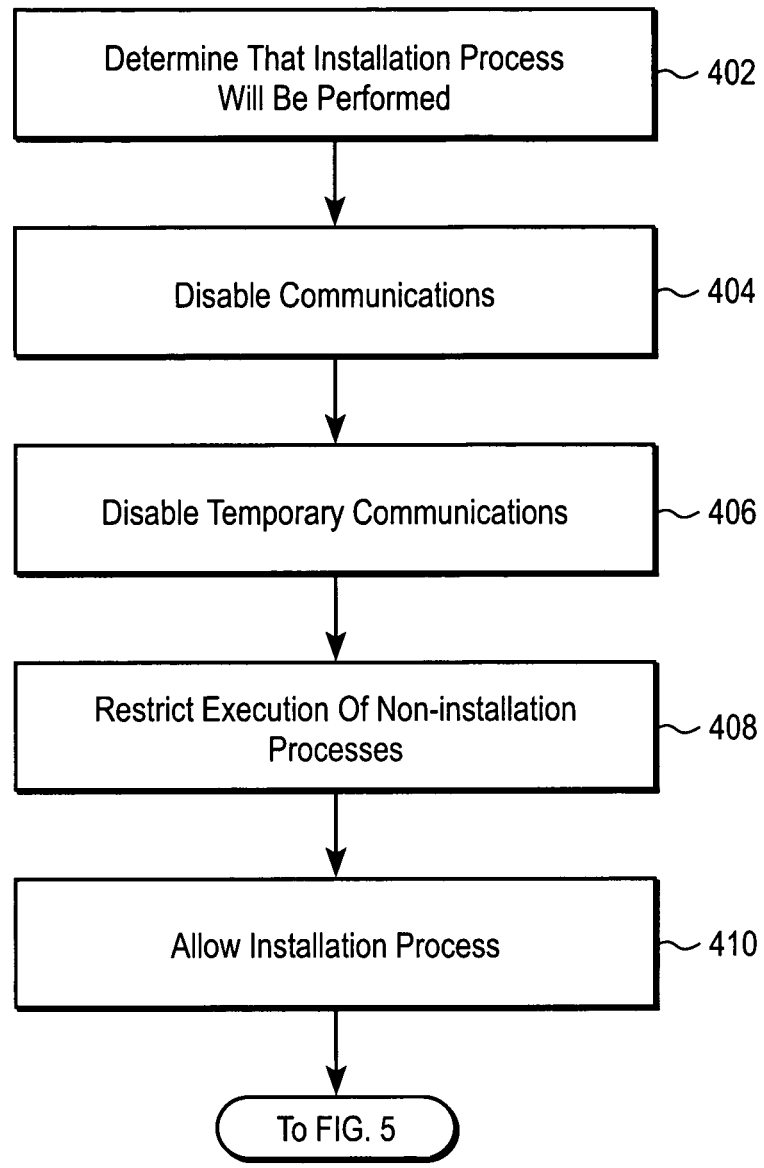
FIG. 4 is a flowchart illustrating steps performed to protect a computer during an installation or migration of software by disabling communications, according to one embodiment of the present invention.

Referring now to FIG. 4, there is shown a flowchart illustrating the operation of the protection control module 120, according to some embodiments of the present invention. Specifically, FIG. 4 illustrates the steps of the protection control module 120 involving protecting a computer during an installation or migration of software by disabling communications. It should be understood that these steps are illustrative only. Different embodiments of the protection control module 120 may perform the illustrated steps in different orders, omit certain steps, and/or perform additional steps not shown in FIG. 4 (the same is true for FIG. 5).

As shown in FIG. 4, the protection control module 120 protects or barricades a computer 110 from problems, such as malicious code attacks, during an installation or migration of software on the computer 110. The module 120 determines 402 that the installation process for the software application (e.g., a security software application) will be performed. For example, the module 120 may or may not be incorporated into the installation software for installing the application. Thus, the module 120 might be notified or otherwise become aware that the user is downloading and attempting to install/migrate a software application. When the installation process begins, the module 120 disables 404 substantially all communication through external network connection ports for the computer that are unneeded for the installation process. In some embodiments, the module 120 might actually disable 404 all of the computer system's network connections (without regard to whether the connections are needed or unneeded for installation).

In some embodiments, the module 120 allows temporary installation communications to take place on external network connection ports required for the installation process. As described above, some programs for installation may require communication over an external network in order for the installation/migration to be completed. If these temporary communications are allowed, they may occur throughout the installation/migration in some embodiments. However, in other embodiments, the module 120 disables 406 the temporary installation communications after a defined period of time or once the external network connection ports are no longer needed for the installation process.

In some embodiments, the module 120 restricts 408 execution of substantially all processes which are not associated with the installation of the security software application. Thus, in these embodiments, non-installation processes are prevented from being executed on the computer 110 during the installation process. The module 120 then allows 410 the installation process for the security software application to be performed on the computer 110. Thus, the application is installed or migrated on the computer 110.

Figure 5:
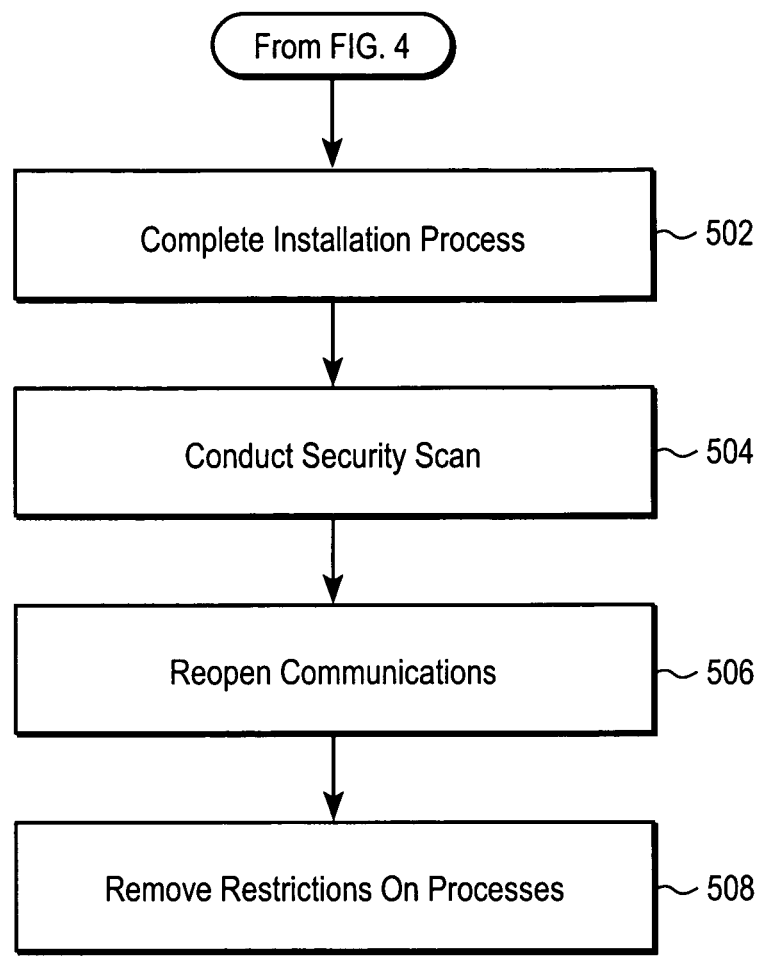
FIG. 5 is a flowchart illustrating steps performed after installation/migration to reopen communications, according to one embodiment of the present invention.

Referring now to FIG. 5, there is shown a flowchart illustrating the operation of the protection control module 120, according to some embodiments of the present invention. Specifically, FIG. 5 illustrates the steps of the protection control module 120 after installation/migration to reopen communications.

As stated above, the installation or migration of the software application is allowed 410 to occur while communications are disabled 404, 406 and/or non-installation processes are restricted 408. The installation process can then be completed 502. In some embodiments, the module 120 then reopens 506 communications through the external network connection ports upon completion of the installation process. Thus, the communications can remain restricted or disabled until the installation or migration is complete. However, in some embodiments, communication is reopened 506 after a security scan is conducted 504 (e.g., by the security software application or new version of the application that was just installed/migrated onto the computer 110), or after some other defined event occurs. In addition, if execution of non-installation processes was restricted 408, these restrictions can be removed 508. In some embodiments, the restrictions are removed earlier in the flow of events (e.g., before communications are reopened or after the installation processeshave completed their functions and the processes are no longer needed). If there is a failure at any point in the installation process, the communications can be reopened 506 and restrictions on processes removed 508 so the user can continue using the computer 110 without having communications/processes hindered until the installation/migration is attempted again.

As will be understood by those familiar with the art, the invention may be embodied in other specific forms without departing from the spirit or essential characteristics thereof.

Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

I claim:

1. A computer program product having a non-transitory computer-readable storage medium having computer program instructions recorded thereon for protecting a computer during an installation process for a security software application on the computer, the computer program instruction comprising instructions for:

determining that the installation process for the security software application will be performed, wherein the installation process is a process selected from a group consisting of: a process for installing a security software application on the computer and a process for migrating from a first version of the security software application to second version of the security software application;

after determining that the installation process will be performed and at the start of the installation process:

storing information needed for the installation process in a storage medium accessible by the installation process without communication through external network connection ports;

disabling all communication through the external network connection ports for the computer;

restricting execution of processes that are not associated with the installation process for the security software application;

allowing the installation process for the security software application to be performed on the computer while all communications through the external network connection ports are disabled and while the processes not associated with the installation process are restricted during the installation process;

responsive to the installation process requesting communication through the external network connection ports, enabling the requested communication during the installation process; and reopening the communication through the external network connection ports and releasing the restriction on the processes upon completion of the installation process.

2. The computer program product of claim 1, wherein reopening the communication through the external network connection ports upon completion of the installation process further comprises reopening communication after conducting a security risk scan of the computer.

3. A computer-implemented method of protecting a computer during an installation process for a security software application on the computer, the method comprising:

using a computer processor configured to execute method steps, the steps comprising:
- determining that the installation process for the security software application will be performed, wherein the installation process is a process selected from a group consisting of: a process for installing a security software application on the computer and a process for migrating from a first version of the security software application to second version of the security software application;
- after determining that the installation process will be performed and at the start of the installation process:
  - storing information needed for the installation process in a storage medium accessible by the installation process without communication through external network connection ports;
  - disabling all communication through the external network connection ports for the computer;
  - restricting execution of processes that are not associated with the installation process for the security software application;
  - allowing the installation process for the security software application to be performed on the computer, while all communications through the external network connection ports are disabled and while the processes not associated with the installation process are restricted during the installation process;
  - responsive to the installation process requesting communication through the external network connection ports, enabling the requested communication during the installation process; and
  - reopening the communication through the external network connection ports and releasing the restriction on the processes upon completion of the installation process.

4. The method of claim 3, wherein reopening the communication through the external network connection ports upon completion of the installation process further comprises reopening communication after conducting a security risk scan of the computer.

5. A computer system for protecting a computer during an installation process for a security software application on the computer, the system comprising:

a non-transitory computer-readable storage medium storing executable software modules, the software modules comprising:
- a determination module for determining that the installation process for the security software application will be performed, wherein the installation process is a process selected from a group consisting of: a process for installing a security software application on the computer and a process for migrating from a first version of the security software application to second version of the security software application;
- a communication disabling module for, after determining that the installation process will be performed and at the start of the installation process, storing information needed for the installation process in a storage medium accessible by the installation process without communication through external network connection ports, and disabling all communication through the external network connection ports for the computer;
- a process restriction module for, after determining that the installation process will be performed but before starting the installation process, restricting execution of processes that are not associated with the installation process for the security software application;
- an installation module for allowing the installation process for the security software application to be performed on the computer, while all communications through the external network connection ports are disabled and while the processes not associated with the installation process are restricted during the installation process;
- the communication disabling module further for, responsive to the installation process requesting communication through the external network connection ports, enabling the requested communication during the installation process;
- a communication reopening module for reopening the communication through the external network connection ports and releasing the restriction on the processes upon completion of the installation process; and a processor configured to execute the software modules stored by the computer-readable storage medium.

6. The system of claim 5, wherein the communication reopening module is further adapted for reopening communication after conducting a security risk scan of the computer.

7. The computer program product of claim 1, further comprising reopening communication responsive to an error associated with the installation process.

8. A computer program product having a non-transitory computer-readable storage medium having computer program instructions recorded thereon for protecting a computer during an installation process for a security software application on the computer, the computer program instruction comprising instructions for:

- determining that the installation process for the security software application will be performed, wherein the installation process is a process selected from a group consisting of: a process for installing a security software application on the computer and a process for migrating from a first version of the security software application to second version of the security software application;
- after determining that the installation process will be performed and at the start of the installation process:
  - storing information needed for the installation process in a storage medium accessible by the installation process without communication through external network connection ports;
  - disabling all communication through the external network connection ports for the computer;
  - restricting execution of processes that are not associated with the installation process for the security software application;
  - responsive to spawning, during the installation process, of one or more new processes that are not associated with the installation process, suspending the one or more spawned processes;
- allowing the installation process for the security software application to be performed on the computer while all communications through the external network connection ports are disabled and while the processes not associated with the installation process are restricted during the installation process; and
- reopening the communication through the external network connection ports and releasing the restriction on the processes upon completion of the installation process.

9. The computer program product of claim 2, further comprising terminating new processes that are spawned during installation or migration of the security software application.

10. The computer program product of claim 8, further comprising:
   responsive to a failure of the installation process or an error in the installation process, reestablishing the communication through the external network connection ports even though the installation process has not been completed.

11. The computer program product of claim 8, further comprising allowing execution only of processes during the installation process that are necessary for the installation process to be performed on the computer.

12. The computer program product of claim 8, wherein restricting execution of processes further comprises restricting execution of all processes that are not associated with the installation of the security software application.

\* \* \* \* \*